J. A. OLSON.
PISTON RING.
APPLICATION FILED MAR. 8, 1919.

1,357,181. Patented Oct. 26, 1920.

Inventor.
John. A. Olson.
By his Attorneys

UNITED STATES PATENT OFFICE.

JOHN A. OLSON, OF MINNEAPOLIS, MINNESOTA.

PISTON-RING.

1,357,181.  Specification of Letters Patent.  Patented Oct. 26, 1920.

Application filed March 8, 1919. Serial No. 281,560.

*To all whom it may concern:*

Be it known that I, JOHN A. OLSON, a citizen of the United States, residing at Minneapolis, in the county of Hennepin and State of Minnesota, have invented certain new and useful Improvements in Piston-Rings; and I do hereby declare the following to be a full, clear, and exact description of the invention, such as will enable others skilled in the art to which it appertains to make and use the same.

This invention relates to piston rings of the non-leak or seal-joint type, and has for its object to improve the construction and operation thereof. Generally stated, the invention consists of the novel construction and combination of parts hereinafter described and defined in the claims.

The invention is illustrated in the accompanying drawings, wherein like characters indicate like parts throughout the several views.

Referring to the drawings:—

Figure 1:
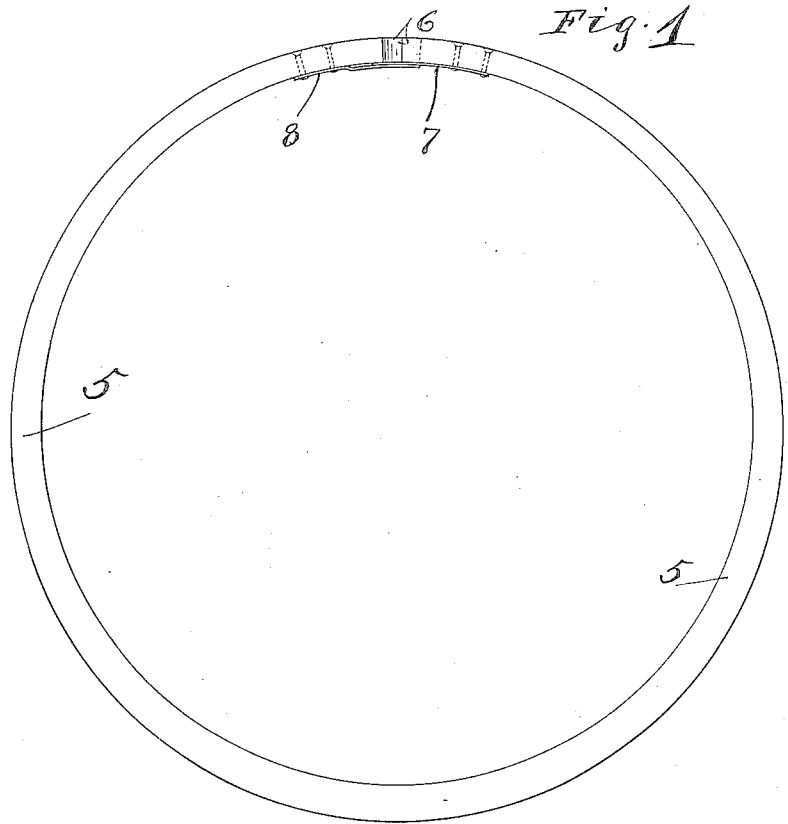
Figure 1 is a side elevation of the improved ring.
Figure 2:
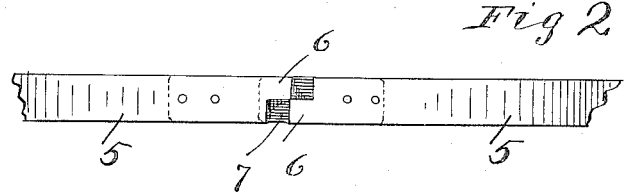
Fig. 2 is a plan view of the ring with some parts broken away.
Figure 3:
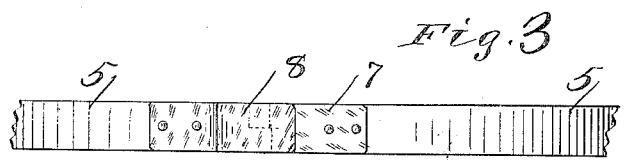
Fig. 3 is a bottom plan view of the parts shown in Fig. 2.
Figure 4:
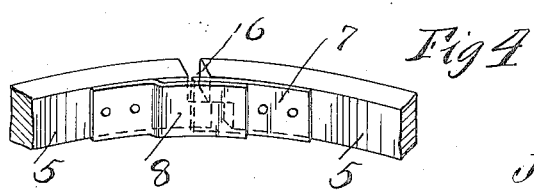
Fig. 4 is a perspective view of the parts shown in Fig. 2.

This ring 5, like many other piston rings, is split at one place, and formed with overlapped, rectangular, transversely reduced end portions 6. When the ring is within the cylinder of an engine, the overlapped end portions 6 will form a tight joint that will prevent the escape of air or compressed gases in a direction transversely through the ring, but will not prevent the escape of air or gases downward and upward through the gaps at the ends. To prevent the escape of air or gases in the latter noted direction, a segmental joint-plate 7, preferably of thin spring steel, is riveted at one end to one of the ends of the ring, and its free end projects so that it overlaps the inner surface of the other end of the ring, and thus in a direction radially of the ring closes the gaps at the joint or ends of the ring.

To hold the free end of the joint-plate 7 against the inner surface of the ring and to also form a tight joint therewith, I provide a secondary joint-plate 8 that is riveted or otherwise secured at one end, to the other end of the piston ring. The free end of the secondary joint-plate 8 overlaps the free end of the primary joint-plate 7, and also laps the spaces between the end of the ring, and thus gives double security against the escape of gases through the ring joint, in a direction radially of the ring. Both of the plates, 7 and 8, are the full width of the ring. The free end of the joint-plate 7 has such circumferential projection, that it will lap the ring joint when the ring is expanded; and the secured end of the secondary joint-plate 8 is at such distance from the ring joint that it will clear the free end of the joint-plate 7 when the ring is contracted, so as to bring its lapped ends close together.

The joint-plates may be applied to piston rings at comparatively small cost and their application makes piston rings with lapped ends, of the most thoroughly leak-proof character.

What I claim is:—

The combination with a piston ring having transversely reduced lapped ends, of a primary joint plate formed independently of said ring, of flat spring metal and rigidly secured to the inner surface of one end of said ring and projecting circumferentially beyond that end of the said ring, and a secondary joint plate also formed independently of said ring and of flat spring metal secured to the inner surface of the other end of said ring and projecting circumferentially beyond the same, the said two joint plates being lapped to hold the ends of the piston ring alined, and both of said joint plates being simple flat members the full width of said ring and coöperating to seal the joint between the lapped ends thereof.

In testimony whereof I affix my signature in presence of two witnesses.

JOHN A. OLSON.

Witnesses:
CLARA DEMAREST,
E. S. SACKETT.